United States Patent
Lee et al.

(10) Patent No.: US 7,973,865 B2
(45) Date of Patent: Jul. 5, 2011

(54) THIN FILM TRANSISTOR DISPLAY PLATE AND LIQUID CRYSTAL DISPLAY HAVING THE SAME

(75) Inventors: Bong-jun Lee, Seoul (KR); Byeong-jae Ahn, Seoul (KR); Sung-man Kim, Seoul (KR); Hyun-ho Kang, Ansan-si (KR)

(73) Assignee: Samsung Electronics Co., Ltd. (KR)

( * ) Notice: Subject to any disclaimer, the term of this patent is extended or adjusted under 35 U.S.C. 154(b) by 1200 days.

(21) Appl. No.: 11/504,922

(22) Filed: Aug. 16, 2006

(65) Prior Publication Data

US 2007/0040951 A1 Feb. 22, 2007

(30) Foreign Application Priority Data

Aug. 16, 2005 (KR) ................ 10-2005-0074836

(51) Int. Cl.
*G02F 1/1343* (2006.01)
(52) U.S. Cl. ........................................... 349/39
(58) Field of Classification Search .................. None
See application file for complete search history.

(56) References Cited

U.S. PATENT DOCUMENTS

| 7,477,335 | B2 * | 1/2009 | Cho et al. ................ 349/43 |
| 7,626,646 | B2 * | 12/2009 | Hoshino ................ 349/39 |
| 2004/0061809 | A1 * | 4/2004 | Lee ................ 349/43 |
| 2004/0212751 | A1 * | 10/2004 | Lee ................ 349/42 |
| 2007/0177067 | A1 * | 8/2007 | Kim et al. ................ 349/43 |

FOREIGN PATENT DOCUMENTS

| CN | 1252532 | 5/2000 |
| CN | 1304055 | 7/2001 |

OTHER PUBLICATIONS

Chinese Office Action for application No. 200610143755.2 dated Jul. 10, 2009 with English translation.

* cited by examiner

*Primary Examiner* — Timothy Rude
(74) *Attorney, Agent, or Firm* — Cantor Colburn LLP

(57) ABSTRACT

A thin film transistor ("TFT") display plate, capable of reducing a load on a gate line, increasing an aperture ratio and preventing light leakage, includes an insulating substrate, a gate line formed on the insulating substrate, a storage electrode line spaced apart from the gate line and formed on an insulating substrate, a data line insulated from the gate line and the storage electrode line and intersecting the gate line, a pixel electrode formed for each pixel defined by the gate line and the data line, a thin film transistor ("TFT") connected to the gate line and the data line to apply a voltage to the pixel electrode, and a storage electrode formed on the same layer as the data line and connected to the storage electrode line to form one terminal of a storage capacitor along with the pixel electrode as the other terminal of the storage capacitor.

20 Claims, 6 Drawing Sheets

THIN FILM TRANSISTOR DISPLAY PLATE AND LIQUID CRYSTAL DISPLAY HAVING THE SAME

This application claims priority to Korean Patent Application No. 10-2005-0074836, filed on Aug. 16, 2005, and all the benefits accruing therefrom under 35 U.S.C. §119, and the contents of which in its entirety are herein incorporated by reference.

BACKGROUND OF THE INVENTION

1. Field of the Invention

The present invention relates to a thin film transistor ("TFT") display plate and a liquid crystal display ("LCD") having the same, and more particularly, to an LCD capable of reducing a load on a gate line, increasing an aperture ratio and preventing light leakage.

2. Description of the Related Art

A liquid crystal display ("LCD") includes a common electrode display plate including a color filter and a thin film transistor ("TFT") display plate including a TFT array. The common electrode display plate and the TFT display plate are opposite to and face each other when assembled with a seal line interposed between the two plates. A liquid crystal layer is formed at an air gap defined between the common electrode display plate and the TFT display plate. In particular, an LCD includes a common electrode display plate and a TFT display plate including respective electrodes and a liquid crystal layer interposed between the two display plates. When a voltage is applied to the electrodes, the LCD displays an image by adjusting the amount of light transmitted therethrough by rearrangement of liquid crystal molecules of the liquid crystal layer. Since an LCD is a non-emissive device, a backlight unit used as a light source is located at the back of the TFT display plate. The transmittance of light emitted from the backlight is adjusted by controlling the orientation of liquid crystals of the liquid crystal layer.

The thin film transistor ("TFT") display plate includes a plurality of gate lines, data lines and pixel electrodes. The gate lines extend in a row direction and transmit a gate signal. The data lines extend in a column direction and transmit a data signal. Each pixel of the TFT display plate is connected to a gate line and a data line and includes a switching device and a storage capacitor.

Here, the switching device is formed at an intersection point between a gate line and a data line and is a three-terminal device including a control terminal connected to a gate line, an input terminal connected to a data line and an output terminal connected to a pixel electrode. The storage capacitor and a liquid crystal capacitor are connected to the output terminal of the switching device.

A conventional LCD includes a storage capacitor to store a data voltage applied to a pixel electrode. One terminal of the storage capacitor is connected to the output terminal of the switching device and the other terminal of the storage capacitor is connected to a previous gate line. Such a connection scheme is referred to as a previous gate scheme.

With the tendency of LCDs becoming larger in size and having more pixels, a storage capacitor configured according to the previous gate scheme imposes a large load on a gate line, causing signal delay. As a result, it is difficult to effectively implement the storage capacitor. In particular, when a drive integrated circuit ("IC") is directly formed on a TFT array plate according to an amorphous silicon gate ("ASG") scheme, the circuit (or wire) of the drive IC should be formed in a large area to reduce a load increased by the storage capacitor configured according to the previous gate scheme.

Moreover, in the conventional LCD, a black matrix is formed on a common electrode display plate corresponding to a data line to prevent light leakage around the data line. Since light generated from backlight under a TFT display plate is incident at various angles with respect to the data line and is reflected at a large angle from the data line, a black matrix having a large area needs to be formed to prevent light leakage. Since the increase in the area of the black matrix leads to a decrease in the aperture ratio of an LCD, luminance is degraded while light leakage is prevented.

BRIEF SUMMARY OF THE INVENTION

Exemplary of the present invention provides a thin film transistor ("TFT") display plate capable of reducing a load on a gate line, increasing an aperture ratio and preventing light leakage.

Exemplary of the present invention also provides a liquid crystal display ("LCD") having the TFT display plate.

The above stated aspect as well as other aspects, features and advantages, of the present invention will become clear to those skilled in the art upon review of the following detailed description.

In an exemplary embodiment of an TFT display plate according to the present invention, the TFT display plate includes an insulating substrate, a gate line formed on the insulating substrate, a storage electrode line spaced apart from the gate line and formed on an insulating substrate, a data line insulated from the gate line and the storage electrode line, the data line intersecting the gate line, a pixel electrode formed for each pixel defined by the gate line and the data line, a thin film transistor ("TFT") connected to the gate line and the data line to apply a voltage to the pixel electrode, and a storage electrode formed on the same layer as the data line and connected to the storage electrode line to form one terminal of a storage capacitor along with the pixel electrode as the other terminal of the storage capacitor.

In an exemplary embodiment of an LCD according to the present invention, the LCD includes a first display plate comprising an insulating substrate, a gate line formed on the insulating substrate, a storage electrode line spaced apart from the gate line and formed on an insulating substrate, a data line insulated from the gate line and the storage electrode line, the data line intersecting the gate line, a pixel electrode formed for each pixel defined by the gate line and the data line, a TFT connected to the gate line and the data line to apply a voltage to the pixel electrode, a storage electrode formed on the same layer as the data line and connected to the storage electrode line to form one terminal of a storage capacitor along with the pixel electrode as the other terminal of the storage capacitor, and a floating bar formed for each pixel adjacent to and along the data line, at least a portion of the floating bar overlapped by the pixel electrode, a second display plate facing the first display plate and having a black matrix, and a liquid crystal layer interposed between the first display plate and the second display plate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

An exemplary embodiment of a liquid crystal display ("LCD") according to the present invention will now be described with reference to the accompanying drawings.

Hereinafter, a TFT display plate of the LCD will first be described in detail with reference to FIGS. 1A through 1D.

Figure 1A:
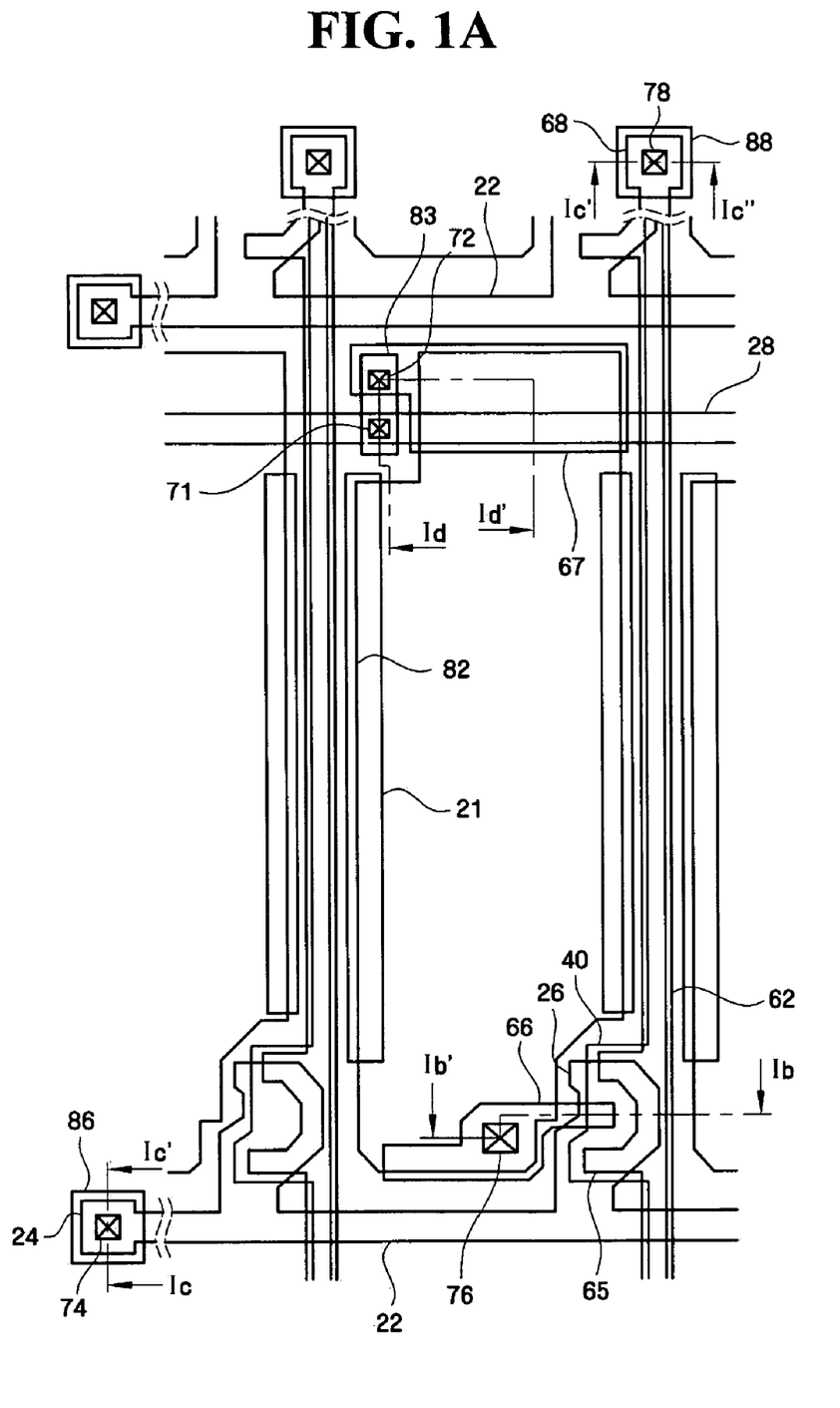
FIG. 1A is a plan view illustrating a layout of an exemplary embodiment of a thin film transistor ("TFT") display plate of a liquid crystal display ("LCD") according to the present invention.
Figure 1B:
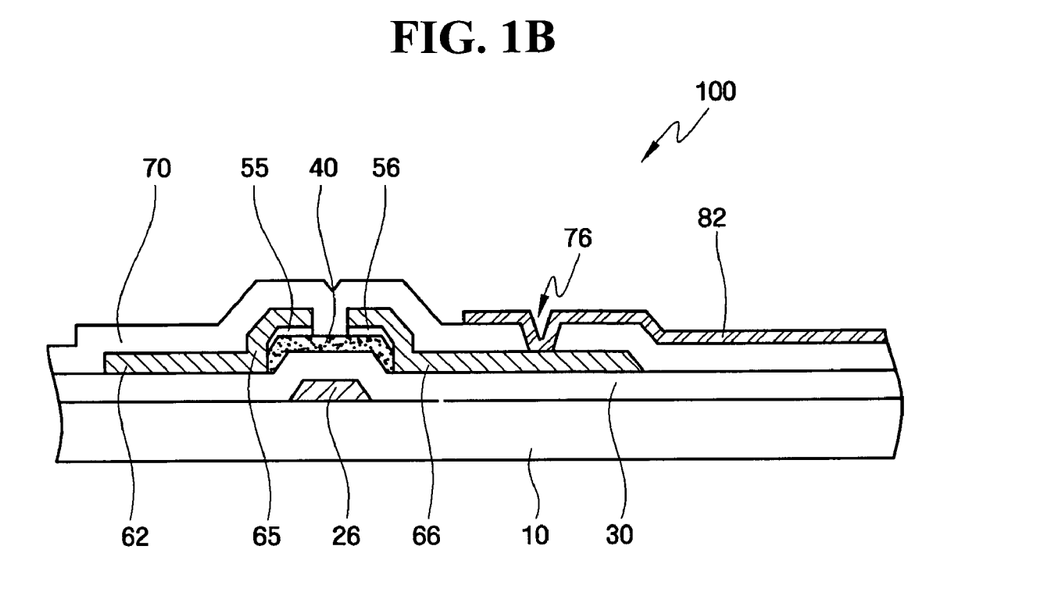
FIG. 1B is a cross-sectional view taken along line Ib-Ib' of the TFT display plate of FIG. 1A.
Figure 1C:
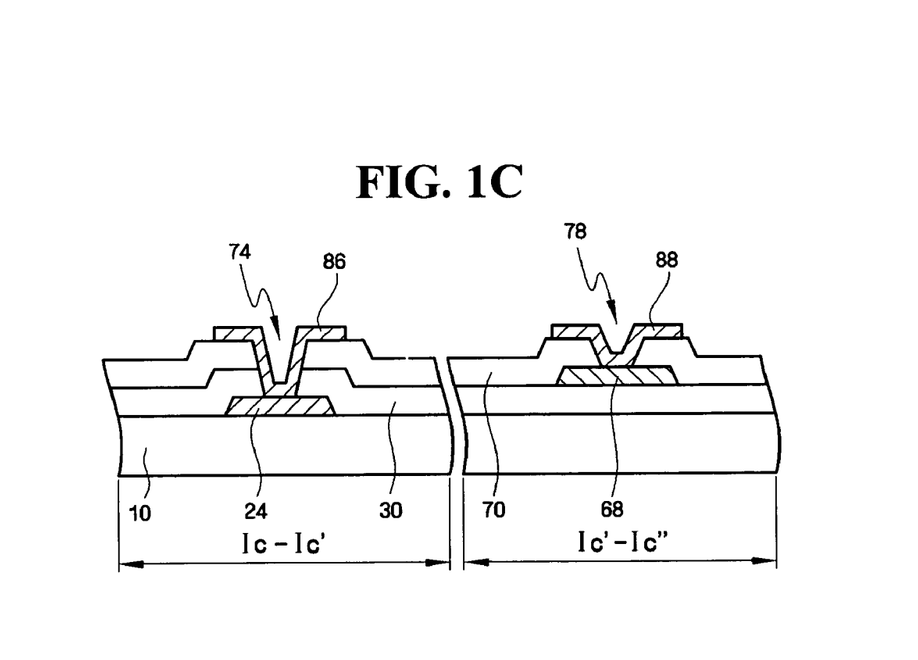
FIG. 1C is a cross-sectional view taken along lines Ic-Ic' and Ic'-Ic" of the TFT display plate of FIG. 1A.
Figure 1D:
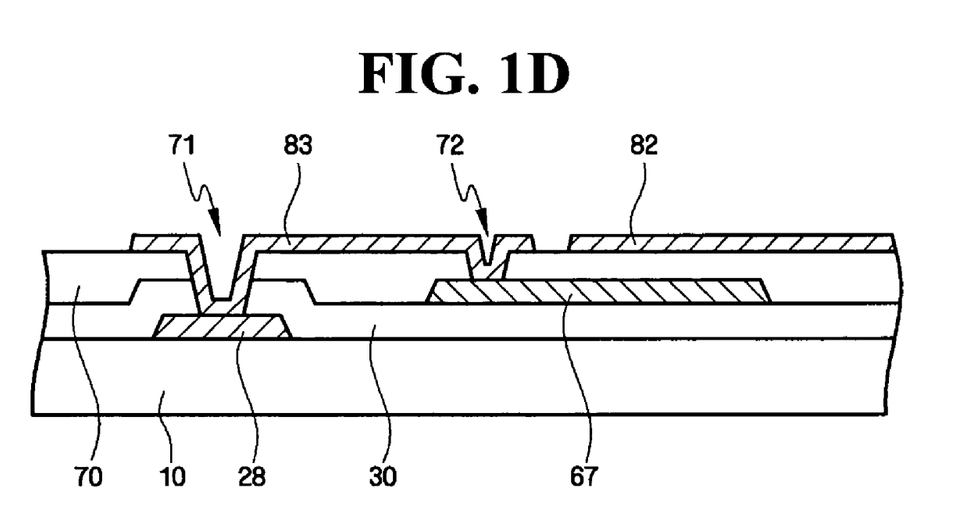
FIG. 1D is a cross sectional view taken along line Id-Id' of the TFT display plate of FIG. 1A.

FIG. 1A is a plan view illustrating a layout of an exemplary embodiment of a thin film transistor ("TFT") display plate of a liquid crystal display ("LCD") according to the present invention. FIG. 1B is a cross-sectional view taken along line Ib-Ib' of the TFT display plate of FIG. 1A. FIG. 1C is a cross-sectional view taken along line Ic-Ic' and Ic'-Ic" of the TFT display plate of FIG. 1A. FIG. 1D is a cross-sectional view taken along line Id-Id' of the TFT display plate of FIG. 1A.

Referring FIGS. 1A through 1D, a gate line 22 is formed in a row direction on an insulating substrate 10. A protruding gate electrode 26 is formed extending from the gate line 22. A gate line end portion 24 receiving a gate signal from the outside and transmitting the received gate signal to the gate line 22 is formed at an end of the gate line 22. The width of the gate line end portion 24 is expanded to be connected to an external circuit. The gate line 22, the gate line end portion 24 and the gate electrode 26 form a gate wire (22, 24, 26).

A floating bar 21 is formed separately for each pixel in a column direction on the insulating substrate 10. The floating bar 21 is electrically floated from its periphery and is arranged at both sides of a data line 62 to prevent light leakage caused by the data line 62, which will be later described in detail with reference to FIGS. 3A through 3C.

A storage electrode line 28 extending in a row direction in parallel with the gate line 22 is formed on the insulating substrate 10.

The gate wire (22, 24, 26) and the storage electrode line 28 may be made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. In addition, the gate wire (22, 24, 26), the floating bar 21 and the storage electrode line 28 may have a multi-layered structure including two conductive films (not shown) having different physical characteristics. One of the two conductive films in exemplary embodiments may be made of a low resistivity metal including Al containing metal, Ag containing metal, and Cu containing metal for reducing signal delay or voltage drop in the gate wire (22, 24, 26), the floating bar 21 and the storage electrode line 28. The other film may be made of material such as a Mo containing metal, Cr, Ta or Ti, which have good physical, chemical and electrical contact characteristics with other materials, such as indium tin oxide (ITO) or indium zinc oxide (IZO). Examples of combinations of the two conductive films are a lower Cr film and an upper Al (alloy) film and a lower Al (alloy) film and an upper Mo (alloy) film. However, the gate wire (22, 24, 26), the floating bar 21 and the storage electrode line 28 may be made of various other metals or conductors.

A gate insulating layer 30, made of silicon nitride (SiNx), is formed on the gate wire (22, 24, 26), the floating bar 21, and the storage electrode line 28.

A semiconductor layer 40, made of, for example, amorphous silicon hydride or polycrystalline silicon, is formed on the gate insulating layer 30. The semiconductor layer 40 may be formed in various shapes, such as an island shape or a line shape, and, for example, may be formed in a line shape extending over the gate electrode 26 under the data line 62 like in the current exemplary embodiment of the present invention. Alternatively, the semiconductor layer 40 may be formed in an island shape on the gate electrode 26. When the semiconductor layer 40 is formed in a line shape, it may be formed by being patterned in the same manner as the data line 62 or using a separate mask.

Ohmic contact layers 55 and 56, made of, for example, silicide or n+amorphous silicon hydride in which an n-type impurity is highly doped, are formed on the semiconductor layer 40. The ohmic contact layers 55 and 56 may have a variety of shapes such as an island shape or a line shape. In the illustrative exemplary embodiment, for example, the ohmic contact layers 55 and 56 are formed under the drain electrode 66 and the source electrode 65 in an island shape. When the ohmic contact layers 55 and 56 are formed in a line shape, they may be disposed and extend over or under the data line 62.

The data line 62 and the drain electrode 66 are formed on the ohmic contact layer 55 and 56 and the gate insulating layer 30. The data line 62 extends in a column direction and intersects the gate line 22 to define pixels. The source electrode 65 extending over the semiconductor layer 40 is formed as a branch of the data line 62. A data line end portion 68 receiving a data signal from other layers or the outside and transmitting the received data signal to the data line 62 is formed at an end of the data line 62. The width of the data line end portion 68 is expanded to be connected to an external circuit. The drain electrode 66 is separated from the source electrode 65 and is formed on the semiconductor layer 40 opposite to the source electrode 65 in view of the gate electrode 26.

The drain electrode 66 includes a bar-type pattern on the semiconductor layer 40 and a drain electrode extension portion having a large area extending from the bar-type pattern and having a contact hole 76 therein.

The data line 62, the source electrode 65, the drain electrode 66 and the data line end portion 68 form a data wire (62, 65, 66, 68).

A storage electrode 67 is made of the same material as the data wire (62, 65, 66, 68) in the same layer as the data wire (62, 65, 66, 68). The storage electrode 67 is connected to the storage electrode line 28, and a storage capacitor includes the storage electrode 67 as a terminal, the other terminal being a pixel electrode 82, and a passivation layer 70 interposed between the two terminals.

In exemplary embodiments, the data wire (62, 65, 66, 68) and the storage electrode 67 may be formed as a single layer or a multiple layer made of at least one material selected from the group consisting of aluminum (Al), chromium (Cr), molybdenum (Mo), tantalum (Ta) and titanium (Ti). For example, the data wire (62, 65, 66, 68) and the storage electrode 67 may be made of refractory metal such as Cr, a metal containing Mo, Ta or Ti. Alternatively, the data wire (62, 65, 66, 68) and the storage electrode 67 may have a multi-layered structure including a lower film (not shown) made of a lower refractory metal film and a low-resistivity upper film (not shown). Examples of the multi-layered structure include a double-layered structure having a lower Cr film and an upper Al (alloy) film, a double-layered structure having a lower Al (alloy) film and an upper Mo (alloy) film, and a triple-layered structure having a lower Mo film, an intermediate Al film, and an upper Mo film.

At least a portion of the source electrode 65 overlaps the semiconductor layer 40, and the drain electrode 66 is opposite to the source electrode 65 in view of the gate electrode 26. At least a portion of the drain electrode 66 overlaps the semiconductor layer 40. Here, the ohmic contact layers 55 and 56 are interposed between the underlying semiconductor layer 40 and the source electrodes 65 and the drain electrodes 67, respectively, to reduce the contact resistance between them.

The passivation layer 70 is an insulating and dielectric layer formed on the data wire (62, 65, 66, 68), the storage electrode 67 and an exposed portion of the semiconductor layer 40. Here, the passivation (protective) layer 70 may be made of an inorganic insulator such as silicon nitride or silicon oxide, a photosensitive organic material having a good flatness characteristic, or a low dielectric insulating material such as a—Si:C:O and a—Si:O:F formed by plasma enhanced chemical vapor deposition ("PECVD"). In addition, when the passivation layer 70 is made of an organic material, it may be formed as a double layer consisting of a lower inorganic layer made of silicon nitride (SiNx) or silicon oxide ($SiO_2$), and an upper organic layer so as to prevent the organic material of the passivation layer 70 from contacting an exposed portion of the semiconductor layer 40 between the source electrode 65 and the drain electrode 66.

Contact holes 72, 76 and 78 are formed on the passivation layer 70 to expose the storage electrode 67, the drain electrode 66, and the data line end portion 68, respectively. Contact holes 71 and 74 are formed on the passivation layer 70 and the gate insulating layer 30 to expose the storage electrode line 28 and the gate line end portion 24, respectively.

A pixel electrode 82 is formed along the shape of a pixel on the passivation layer 70 to be electrically connected to the drain electrode 66 via the contact hole 76. Electric fields are generated between the pixel electrode 82 supplied with the data voltages and the common electrode of the upper display plate 200 (see FIG. 3B), which determine an orientation of liquid crystal molecules in the LC layer (not shown) between the pixel electrode 82 and the common electrode 90 (see FIG. 3B).

In addition, an auxiliary gate line end portion 86 and an auxiliary data line end portion 88 may be formed on the passivation layer 70 to be connected to the gate line end portion 24 and the data line end portion 68 via the contact holes 74 and 78, respectively. In addition, the contact holes 71 and 72 are formed on the passivation layer 70 to expose the storage electrode line 28 and the storage electrode 67, respectively. A connection member 83 is formed on the passivation layer 70 to connect the storage electrode line 28 and the storage electrode 67 via the contact holes 71 and 72. Here, the pixel electrode 82, the auxiliary gate line end portions 86, the data line end portion 88 and the connection member 83 may be the same layer as the pixel electrode 82 or made of a transparent conductor such as ITO or IZO or a reflective conductor such as Al. The auxiliary gate line end portion 86 and the auxiliary data line end portions 88 complement the adhesion with the gate and data line end portions 24 and 68 and external devices.

An alignment layer (not shown) capable of aligning a liquid crystal layer may be coated on the pixel electrode 82, the auxiliary gate line end portion 86, the auxiliary data line end portion 88 and the passivation layer 70.

Still referring to FIGS. 1A and 1D, the LCD according to the present invention can reduce a load on the gate line 22 by forming a storage capacitor using the storage electrode line 28 separately from the gate line 22.

Moreover, in a storage capacitor using the storage electrode 67 and the pixel electrode 82 as both terminals and the passivation layer 70 interposed therebetween as a dielectric layer, a constant storage capacitance can be obtained by reducing the thickness of the passivation layer 70 even when the area of the storage electrode 67 is reduced.

The storage capacitance satisfies the following equation.

$$Cst = \epsilon \times (d/A),$$

where Cst indicates a storage capacitance, $\epsilon$ indicates a dielectric constant of a passivation layer (e.g., dielectric layer), d indicates a thickness of the passivation layer, and A indicates an area of a storage electrode.

For example, when the gate insulating layer 30 is made of SiNx to a thickness of about 4000 Å to about 4500 Å and the passivation layer 70 is made of SiNx to a thickness of about 2000 Å or less, the thickness of the passivation layer 70 is smaller than half of the thickness of the gate insulating layer 30. Thus, by using the passivation layer 70, rather than the gate insulating layer 30, as the dielectric layer of a storage capacitor, a constant storage capacitance can be obtained even when the area of the storage electrode 67 is reduced to ½ or less. In this way, the aperture ratio of the LCD can be increased.

Figure 2:
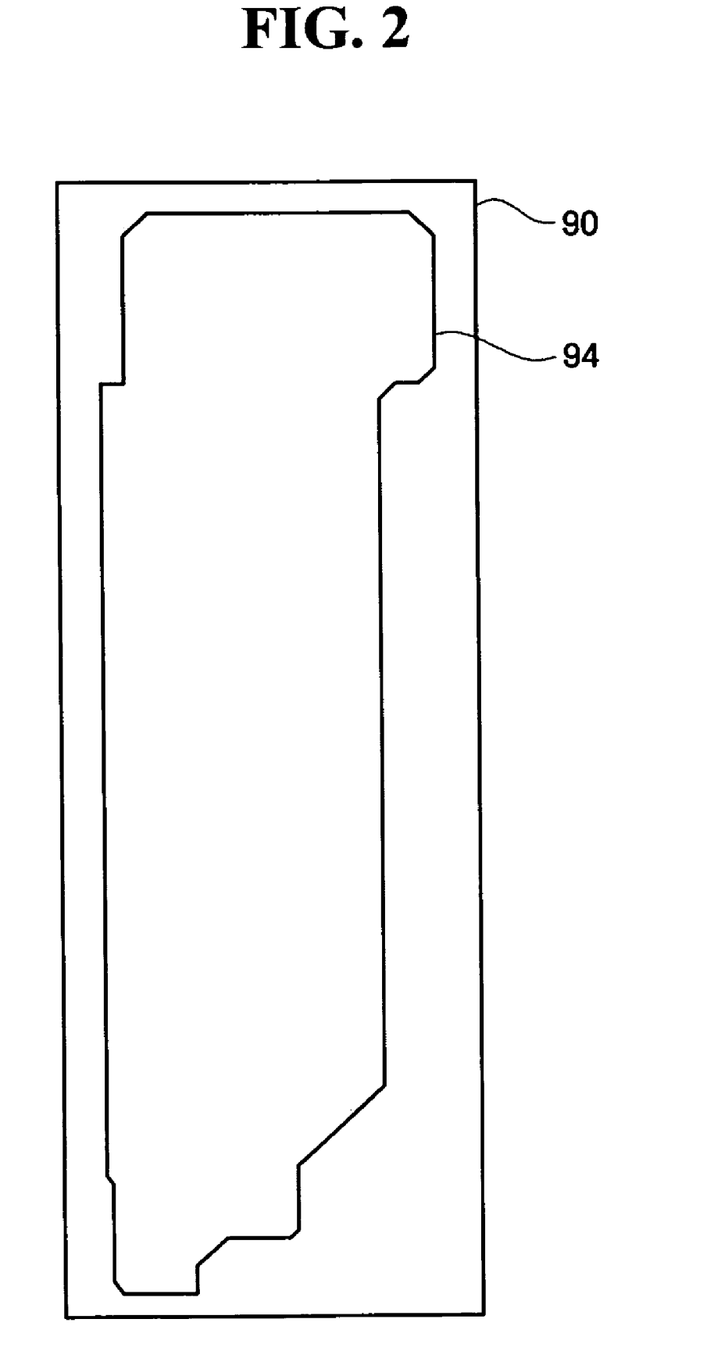
FIG. 2 is a plan view illustrating a layout of an exemplary embodiment of a common electrode display plate for an LCD according to the present invention.
Figure 3A:
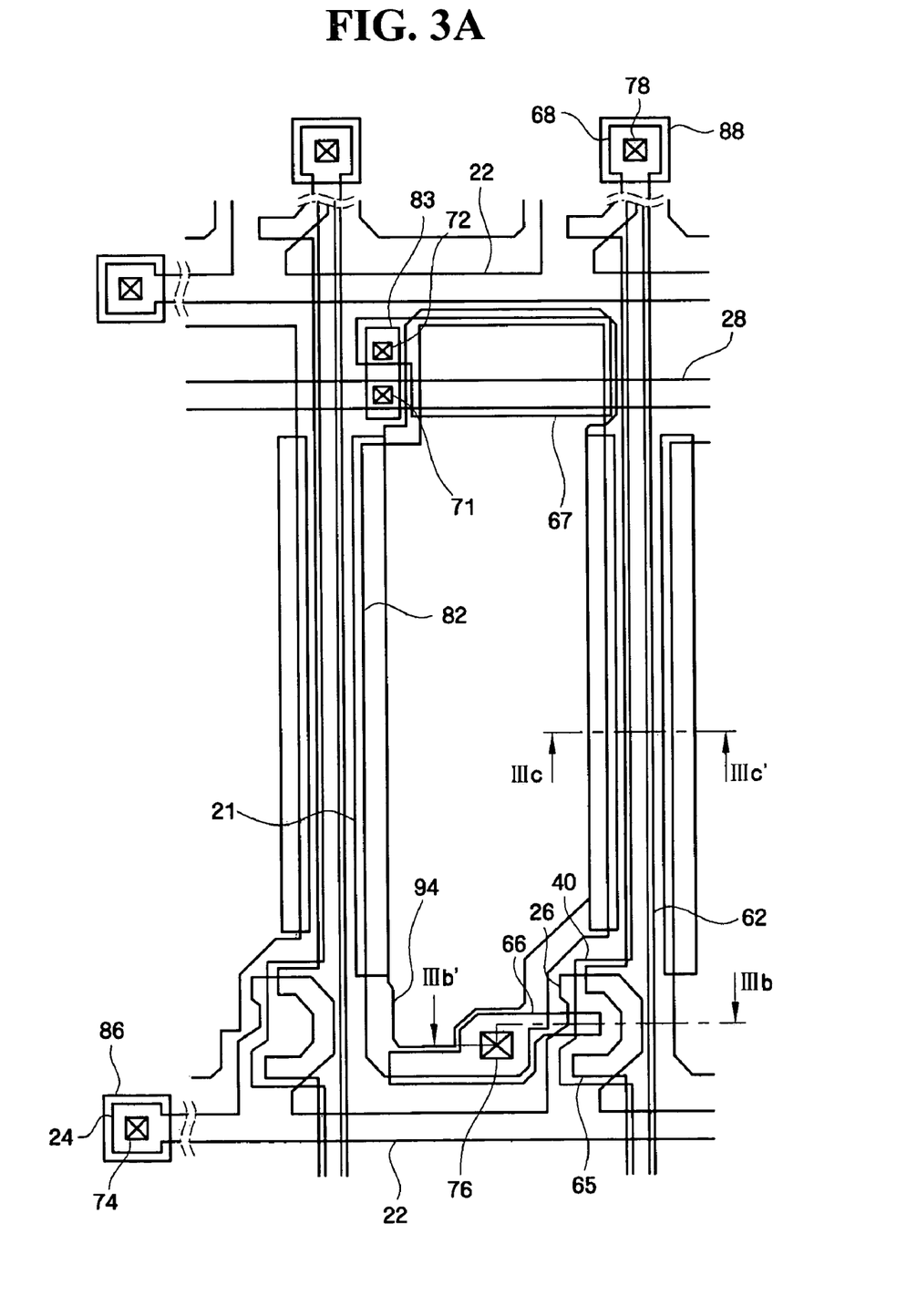
FIG. 3A is a plan view illustrating a layout of an LCD including the TFT display plate of FIG. 1A and the common electrode display plate of FIG. 2.
Figure 3B:
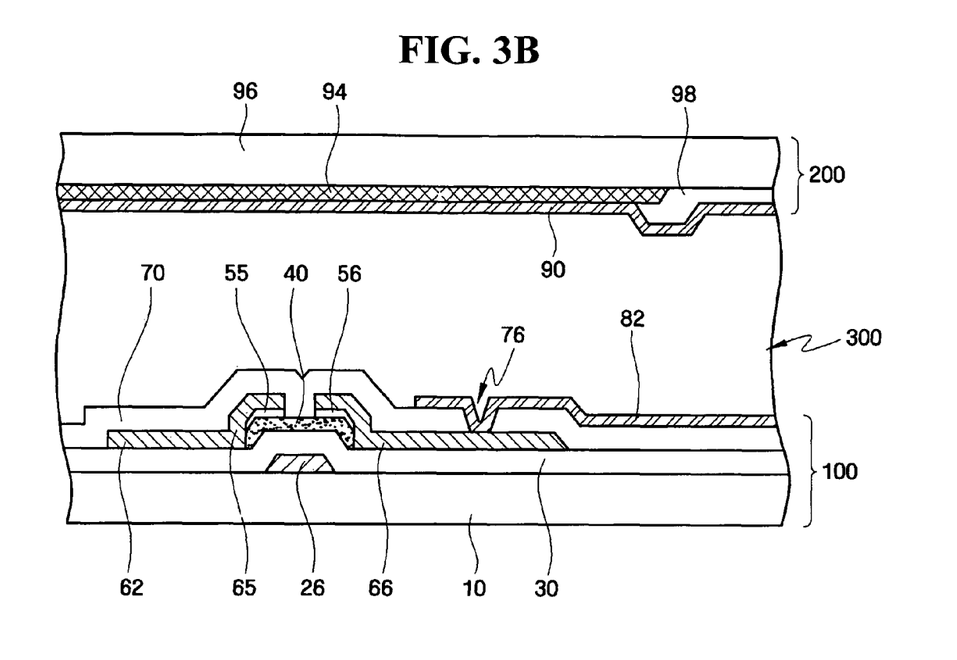
FIG. 3B is a cross-sectional view taken along line IIIb-IIIb' of the LCD of FIG. 3A.
Figure 3C:
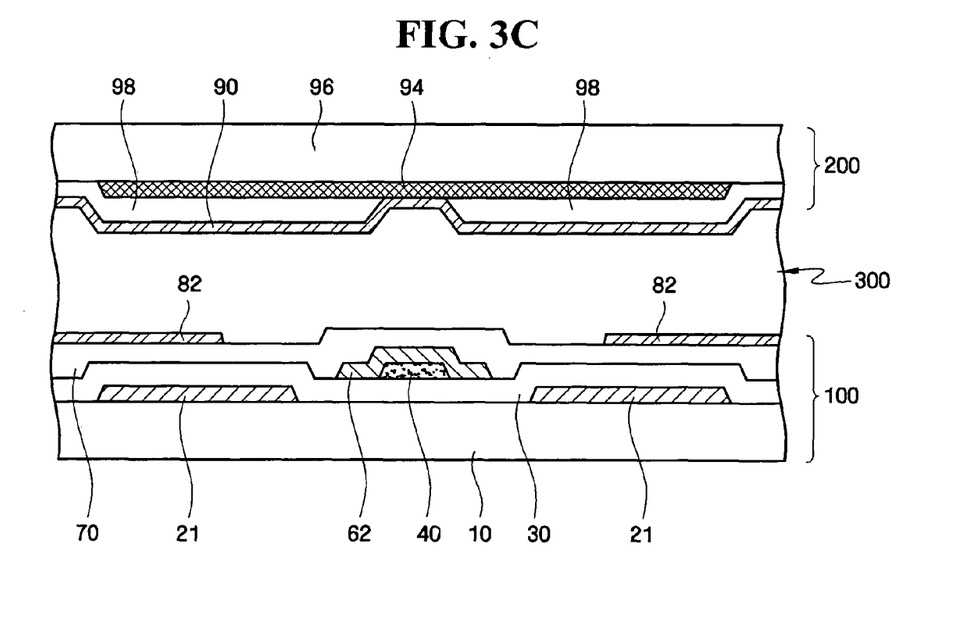
FIG. 3C is a cross sectional view taken along line IIIc-IIIc' of the LCD of FIG. 3A.

Hereinafter, an exemplary embodiment of a common electrode display plate for an LCD according to the present invention and an LCD including the common electrode display plate will be described with reference to FIGS. 2 through 3C. FIG. 2 is a plan view illustrating an exemplary embodiment of a common electrode display plate for an LCD according to the present invention. FIG. 3A is a plan view of an LCD including the TFT display plate of FIG. 1A and the common electrode display plate of FIG. 2. FIG. 3B is a cross-sectional view taken along line IIIb-IIIb' of the LCD of FIG. 3A. FIG. 3C is a cross-sectional view taken along line IIIc-IIIc' of the LCD of FIG. 3A.

Referring to FIGS. 2 through 3B, a black matrix 94 for preventing light leakage and a read/green/blue (RGB) color filter 98 sequentially arranged in a pixel may be formed on an insulating substrate 96 made of a transparent insulating material such as glass. A common electrode 90 is made of a transparent conductive material such as indium tin oxide (ITO) and indium zinc oxide (IZO) on the color filter 98. The common electrode 90 may be coated with an alignment layer (not shown) that aligns liquid crystal molecules.

As shown in FIG. 3B, a TFT display plate 200 and a common electrode display plate 100 are arranged and combined, a liquid crystal layer 300 (see FIG. 3C) is formed between them, thereby forming the basic structure of the exemplary embodiment of the LCD according to the present invention.

The TFT display plate 100 and the common electrode display plate 200 are arranged such that the pixel electrode 82 is accurately overlapped by the color filter 98.

The LCD is completed by positioning components such as a polarizing plate and a backlight on the basic structure of the LCD. At this time, the polarizing plate (not shown) is positioned at both sides of the basic structure, and the transmission axes of both polarizing plates are perpendicular to each other.

Referring to FIGS. 3A and 3C, the floating bar 21 is formed at both sides of the data line 62 on the insulating substrate 10. As mentioned above, the floating bar 21 prevents light leakage from occurring in the periphery of the data line 62. In general, liquid crystal molecules around the data line 62 are not controlled by the pixel electrode 82 and the common electrode 90, thus causing light leakage. In particular, light leakage becomes serious by a backlight passing through a space between the data line 62 and the pixel electrode 82. Moreover, since the backlight is incident to the space at various angles and passes through the space, a black matrix having a large area is required to prevent light leakage. However, according to the present invention, the space between the data line 62 and the pixel electrode 82 is blocked using the floating bar 21 formed at both sides of the data line 62 on the insulating layer 10 and a backlight passing through the space is blocked, thereby preventing light leakage. Thus, the area of the black matrix 94 on the data line 62 can be reduced, contributing to improvement of the aperture ratio of the LCD. Here, the black matrix 94 overlaps at least a portion of the floating bar 21. One side of the black matrix 94 may be aligned with one side of the floating bar 21 in a longitudinal direction or arranged within the contour of the floating bar 21. In addition, the pixel electrode 82 is formed to overlap at least a portion of the floating bar 21 and thus, light leakage between the pixel electrode 82 and the floating bar 21 is prevented, thereby preventing light leakage more efficiently.

As described above, a TFT display plate and an LCD including the same according to the present invention are capable of reducing a load on a gate line end portion, increasing an aperture ratio and preventing light leakage. A load on the gate line end portion is reduced by forming a storage capacitor using a separate storage electrode line. Since the area of a storage electrode connected to a storage electrode line is reduced, a constant storage capacitance can be obtained and an aperture ratio can be improved. Moreover, the area of a black matrix on the data line is reduced by preventing light leakage in the periphery of the data line, thus contributing to enhancement of the aperture ratio. Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limited, but illustrative in all aspects.

What is claimed is:

1. A thin film transistor ("TFT") display plate comprising:
    an insulating substrate;
    a gate line formed on the insulating substrate;
    a storage electrode line spaced apart from the gate line and formed on the insulating substrate;
    a gate insulating layer formed on the gate line and the storage electrode line;
    a data line formed on the gate insulating layer and intersecting the gate line;
    a pixel electrode formed for each pixel defined by the gate line and the data line;
    a thin film transistor (TFT) connected to the gate line and the data line to apply a voltage to the pixel electrode; and
    a storage electrode formed at the same layer as the data line and connected to the storage electrode line to form one terminal of a storage capacitor along with the pixel electrode as the other terminal of the storage capacitor.

2. The TFT display plate of claim 1, further comprising a dielectric layer interposed between the storage electrode and the pixel electrode.

3. The TFT display plate of claim 2, wherein the dielectric layer has a thickness of about 2000 Å or less.

4. The TFT display plate of claim 2, further comprising a connection member,
    wherein the dielectric layer is formed to cover the storage electrode line and the storage electrode, and includes a first contact hole exposing the storage electrode line and a second contact hole exposing the storage electrode, and
    the connection member is formed on the dielectric layer to connect the storage electrode line and the storage electrode via the first contact hole and the second contact hole.

5. The TFT display plate of claim 4, wherein the connection member is the same layer as the pixel electrode.

6. The TFT display plate of claim 4, wherein the connection member is made of a transparent conductive material or a reflective conductive material.

7. The TFT display plate of claim 1, further comprising a floating bar formed for each pixel adjacent to and along the data line.

8. The TFT display plate of claim 7, wherein the floating bar is formed on the same layer as the gate line.

9. The TFT display plate of claim 7, wherein the floating bar is formed as a pair of floating bars, the pair being disposed at both sides of the data line.

10. The TFT display plate of claim 7, wherein the pixel electrode is formed to overlap at least a portion of the floating bar.

11. A liquid crystal display (LCD) comprising:
    a first display plate comprising:
        an insulating substrate;
        a gate line formed on the insulating substrate;
        a storage electrode line spaced apart from the gate line and formed on the insulating substrate;
        a gate insulating layer formed on the gate line and the storage electrode line
        a data line formed on the gate insulating layer and intersecting the gate line;
        a pixel electrode formed for each pixel defined by the gate line and the data line;
        a thin film transistor (TFT) connected to the gate line and the data line to apply a voltage to the pixel electrode;
        a storage electrode formed at the same layer as the data line and connected to the storage electrode line to form one terminal of a storage capacitor along with the pixel electrode as the other terminal of the storage capacitor; and
        a floating bar formed for each pixel adjacent to and extending along the data line, at least a portion of the floating bar overlapped by the pixel electrode,
    a second display plate facing the first display plate and having a black matrix, and
    a liquid crystal layer interposed between the first display plate and the second display plate.

12. The LCD of claim 11, further comprising a dielectric layer interposed between the storage electrode and the pixel electrode.

13. The LCD of claim 12, wherein the dielectric layer has a thickness of about 2000 Å or less.

14. The LCD of claim 12, further comprising a connection member,
    wherein the dielectric layer is formed to cover the storage electrode line and the storage electrode, and includes a first contact hole exposing the storage electrode line and a second contact hole exposing the storage electrode, and
    the connection member is formed on the dielectric layer to connect the storage electrode line and the storage electrode via the first contact hole and the second contact hole.

15. The LCD of claim 14, wherein the connection member is the same layer as the pixel electrode.

16. The LCD of claim 14, wherein the connection member is made of a transparent conductive material or a reflective conductive material.

17. The LCD of claim 11, wherein the floating bar is formed on the same layer as the gate line.

18. The LCD of claim 11, wherein the floating bar is formed as a pair of floating bars disposed at both sides of the data line.

19. The LCD of claim 11, wherein the black matrix overlaps at least a portion of the floating bar.

20. The LCD of claim 19, wherein one side of the black matrix is aligned with one side of the floating bar in a longitudinal direction or arranged within the contour of the floating bar.

* * * * *